United States Patent
Sime et al.

(10) Patent No.: US 8,494,700 B2
(45) Date of Patent: Jul. 23, 2013

(54) DERIVATIVE-BASED HYBRID DRIVE MOTOR CONTROL FOR DRIVELINE OSCILLATION SMOOTHING

(75) Inventors: Karl Andrew Sime, Mason, MI (US); Goro Tamai, West Bloomfield, MI (US); Harry J. Bauer, Troy, MI (US); Brendan M. Conlon, Rochester Hills, MI (US); Min-Joong Kim, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 484 days.

(21) Appl. No.: 12/689,262

(22) Filed: Jan. 19, 2010

(65) Prior Publication Data

US 2011/0178662 A1 Jul. 21, 2011

(51) Int. Cl.
 *G06F 7/00* (2006.01)
(52) U.S. Cl.
 USPC .............................................. 701/22; 701/53
(58) Field of Classification Search
 USPC ........................................................ 701/22
 See application file for complete search history.

(56) References Cited

U.S. PATENT DOCUMENTS

| | | | | |
|---|---|---|---|---|
| 6,552,507 B2 * | 4/2003 | Miyazawa | ............... | 318/568.11 |
| 7,315,774 B2 * | 1/2008 | Morris | ............................. | 701/53 |
| 7,680,567 B2 * | 3/2010 | Syed et al. | ....................... | 701/22 |
| 2009/0145673 A1 * | 6/2009 | Soliman et al. | ............... | 180/65.1 |

* cited by examiner

*Primary Examiner* — Hiep V Nguyen
(74) *Attorney, Agent, or Firm* — Quinn Law Group, PLLC

(57) ABSTRACT

A method minimizes driveline disturbances in a vehicle having a motor generator unit (MGU) and a controller, which may be a motor control processor or a hybrid control processor. The method includes determining a set of motor values of the MGU, including a change in motor speed, a derivative of the change in motor speed, and a motor jerk value; calculating a corrective final torque value for the MGU as a function of the set of motor values; and commanding the corrective final torque value from the MGU during a predetermined event, e.g., engine restart. Calculations and commanding the corrective final torque value are conducted by the controller within a calibrated minimum processing loop time. A vehicle includes first and second MGUs, and a controller electrically connected to the second MGU. The controller has the algorithm for minimizing driveline disturbances as noted above.

17 Claims, 4 Drawing Sheets

DERIVATIVE-BASED HYBRID DRIVE MOTOR CONTROL FOR DRIVELINE OSCILLATION SMOOTHING

TECHNICAL FIELD

The present invention relates to a method and system for minimizing driveline disturbances in a vehicle having at least one electric drive motor.

BACKGROUND OF THE INVENTION

Hybrid electric vehicles (HEV) can selectively utilize an internal combustion engine and one or more high-voltage motor generator units (MGU) as alternate or concurrent power sources to optimize fuel efficiency. That is, an HEV having a full hybrid powertrain can be propelled using purely electrical means at least some of the time, usually immediately upon starting the HEV and when operating below threshold vehicle speeds. One or more MGUs may alternately draw power from and deliver power to an energy storage system (ESS) as needed. Upon launch of the vehicle or when operating above a threshold speed, the engine can be restarted using the MGU or an auxiliary starter motor, depending on the vehicle design, and then engaged with a transmission to propel the vehicle via a set of drive wheels.

Hybrid powertrains typically share various fuel saving features, e.g., regenerative braking and automatic start-stop functionality. Regenerative braking allows for selective recharging of the ESS using the MGU(s). The capability of an HEV to selectively shut off and restart its engine when at a standstill, and/or when operating in a stabilized low-speed drive mode, likewise provides a fuel-saving benefit relative to conventional vehicle designs.

SUMMARY OF THE INVENTION

Accordingly, a method is provided for minimizing driveline disturbances in a vehicle during a predetermined event, e.g., a starting event of the engine using one of a pair of motor generator units (MGUs). The method may be used with a transmission having at least one electric drive motor and at least one gear set. A sudden engine restart may cause such a transient driveline disturbance. Conventional control systems attempt to limit such disturbances using active damping and/or engine cancelation techniques. For example, engine output torque compensation may be achieved via spark retardation to mitigate the driveline disturbance. However, conventional active damping and engine pulse cancellation strategies may remain less than optimal, in part due to delays between communicating the torque command and a resultant torque response.

A hybrid electric vehicle (HEV) usable with the motor control method and system of the present invention may include one or more high-voltage motor generator units (MGUs). The method may be embodied in algorithm form, and may be automatically executed via an onboard controller, such as a hybrid control processor (HCP) or a motor control processor (MCP) depending on the desired application. Execution of the algorithm provides a derivative-based control approach that resides within the controller by directly reading the MGU speed(s) so that the controller can process a set of speed fluctuation information and command the corrective torque from the MGU all in a calibrated minimum processing loop, e.g., 2 milliseconds (ms) for high and low frequency disturbances or approximately 6.25 ms of a Serial Peripheral Interface (SPI), or a Controller Area Network (CAN) bus for low frequency disturbances of less than approximately 30 Hz. Control is thus provided, potentially without being subject to SPI or CAN delays, and potentially without signal aliasing depending on the embodiment. The method may also compensate for residual disturbances left over due to un-modeled effects, e.g., imperfections in a model-based and/or open-loop control system.

The design of the vehicle powertrain may vary without departing from the intended scope of the invention. Any hybrid architecture with any number of MGUs may benefit, as long as at least one MGU is connected to the driveline, i.e., to the transmission output shaft directly or via one or more gear sets of a gear train. For example, a pair of MGUs may be connected via a planetary gear train, with one MGU connected directly to the transmission output shaft according to one embodiment. An MGU connected to the transmission output shaft in this manner may have the control method acting via its dedicated MCP independently from the other MGU in order to directly reduce driveline torque oscillations. Additionally, by better controlling the speed profile of the driveline MGU, fulcrum-stability control is provided for the other MGU. That is, as the first MGU lifts the engine upon restart of the engine, the second or driveline MGU acts as a more stable reaction fulcrum, thus enabling the first MGU to more precisely control engine spin-up and re-fire events.

In particular, a method is provided for minimizing driveline disturbances in a vehicle having an MGU and controller in the form of either a Hybrid Control Processor (HCP) or a Motor Control Processor (MCP), and includes: determining a set of motor values of the MGU, including a change in motor speed, a derivative of the change in motor speed, and a motor jerk value; calculating a corrective final torque value for the MGU as a function of the set of motor values; and commanding the corrective final torque value. The corrective final torque value is commanded during a predetermined event of the vehicle, e.g., an engine restart, to thereby minimize the driveline disturbances during the event. Determining the set of motor values, calculating the corrective final torque value, and commanding the corrective final torque value are all conducted by the controller within a calibrated minimum processing loop time of the controller.

A vehicle is also provided that includes a first and a second MGU, with the second MGU connected to a transmission output shaft of the vehicle. The vehicle includes an algorithm for minimizing driveline disturbances in the vehicle, which may reside in the controller. The algorithm is adapted for determining the set of motor values of the second MGU, calculating the corrective final torque value as a function of the set of motor values, and commanding the corrective final torque value from the second MGU during a starting event of the vehicle using the first MGU, to thereby minimize the driveline disturbances during the starting event. The algorithm determines the motor values and corrective final torque value, and commands the corrective final torque value, all within a calibrated minimum processing loop time of the controller.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
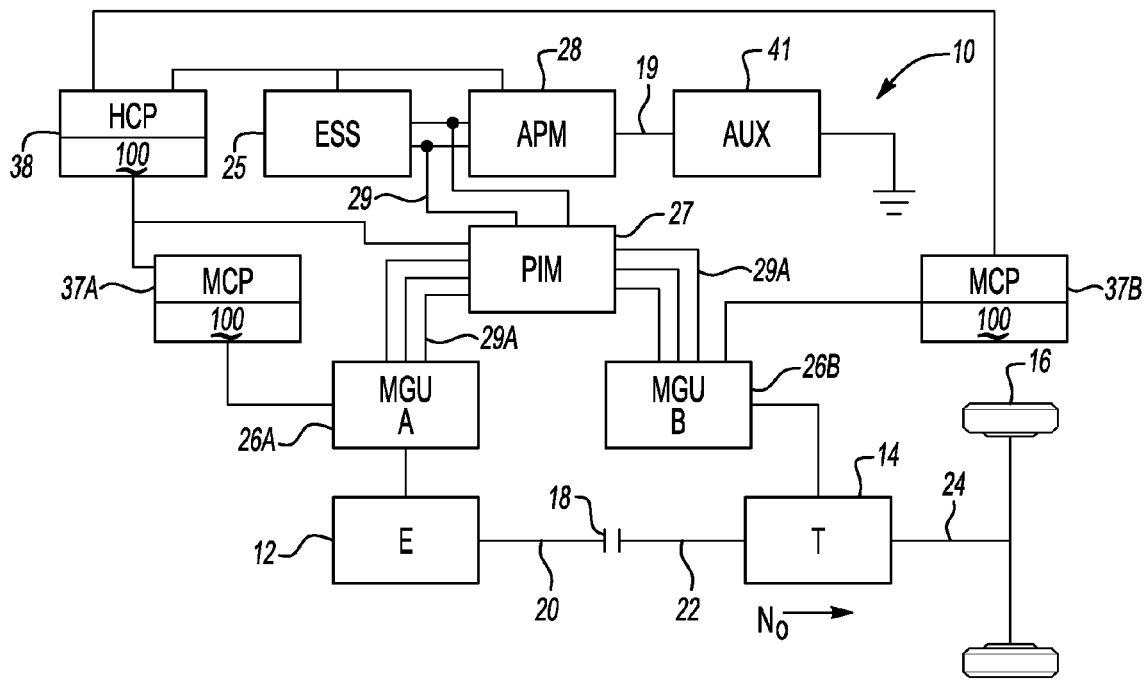
FIG. 1 is a schematic illustration of a vehicle having a driveline disturbance minimization algorithm in accordance with the invention.

Referring to the drawings, wherein like reference numbers correspond to like or similar components throughout the several figures, FIG. 1 shows a vehicle 10 having an engine (E) 12 with auto stop/auto start functionality as explained above. The vehicle 10, which may be configured as a hybrid electric vehicle (HEV), and is adapted for executing an auto stop event during vehicle idle or when operating below a threshold speed, and for executing an auto start event when engine propulsion is again required.

A pair of motor control processors (MCP) 37A, 37B may be programmed with or provided access to an algorithm 100, the execution of which minimizes driveline disturbances of the vehicle 10 during a predetermined event of the vehicle, e.g., a restart of the engine 12, with the algorithm explained in detail below with reference to FIG. 3. The algorithm 100 utilizes motor speed derivatives as explained below, which allows a phase lead. The phase lead in turn allows motor torque commands to lead the driveline disturbance. The lead may occur in the relatively fast processing loop time of the MCP 37A, 37B, or, for controlling low-frequency driveline disturbances, in the higher control loop of a Hybrid Control Processor (HCP) 38. When the HCP 38 is used, the algorithm 100 may be programmed therein as shown. In either embodiment, execution of algorithm 100 optimizes a cancelation of driveline disturbances when one MGU is connected to the driveline of vehicle 10.

The MCP 37A, 37B are electrically connected to a corresponding motor/generator unit (MGU) 26A, 26B as set forth below, and adapted for processing speed fluctuation data via a set of motor values, e.g., a change in motor speed, a derivative of the change in motor speed, and motor jerk components. The engine 12 includes a crankshaft (not shown) and an output member 20. A transmission (T) 14, with a few of the possible variants thereof shown as transmission 14A, 14B, and 14C in FIGS. 2A-C, respectively, has an input member 22 and an output member 24. Output member 20 of the engine 12 may be selectively connected to input member 22 via a clutch device 18. The transmission 14 may be configured as an electrically-variable transmission (EVT) or any other suitable transmission capable of transmitting torque to a set of drive wheels 16 via the output member 24. Output member 24 ultimately rotates at an output speed ($N_O$).

According to one embodiment, the vehicle 10 may include a first high-voltage electric motor/generator unit (MGU) 26A, labeled as MGU A in FIG. 1, e.g., a multi-phase electric machine of approximately 60 volts to approximately 300 volts or more depending on the required design. MGU 26A may be electrically connected to an HV battery or energy storage system (ESS) 25 via an HV direct current (DC) bus 29, a voltage inverter or power inverter module (PIM) 27, and an HV alternating current (AC) bus 29A. The ESS 25 may be selectively recharged using the MGU 26A when operating in its capacity as a generator, for example by capturing energy during a regenerative braking event.

The vehicle 10 may also include a second MGU, labeled as MGU B in FIG. 1. Such an MGU may be directly connected to the driveline of the vehicle 10, and connected to the driveline of vehicle 10, i.e., transmission output shaft 24, via one or more planetary gear sets as explained below with reference to FIGS. 2A-2D. While a single planetary gear set transmission is not shown, those of ordinary skill in the art will recognize that the present invention can also be used for such an embodiment, provided at least one MGU is connected to the driveline. When two MGUs are used, the MCP 37B may act independently on the MGU 26B to directly reduce driveline torque oscillations. Additionally, by better controlling the speed profile of MGU 26B, fulcrum-stability control is provided for MGU 26A. That is, as MGU 26A lifts engine 12 during a restart event of the engine, its reaction fulcrum, i.e., MGU 26B, is stabilized via derivative-based control per algorithm 100. This allows MGU 26A to more precisely control the engine 12 during spin-up and re-fire during an auto start event.

The vehicle 10 may also include an auxiliary power module (APM) 28, e.g., a DC-DC power converter, which is electrically connected to the ESS 25 via the DC bus 29. The APM 28 may also be electrically connected to an auxiliary battery 41, e.g., a 12-volt DC battery, via a low-voltage (LV) bus 19, and adapted for energizing one or more auxiliary systems aboard the vehicle 10, as is understood in the art.

Still referring to FIG. 1, the MCP 37A, 37B may be part of a single vehicle control device or a distributed vehicle control device that is electrically connected to or otherwise placed in electrical communication with each of the MGUs 26A, 26B. Such a control connection may include any required transfer conductors, e.g., a hard-wired or wireless control link(s) or path(s) suitable for transmitting and receiving the necessary electrical control signals for proper power flow control and coordination aboard the vehicle 10. The MCP 37A, 37B may include such control modules and capabilities as might be necessary to execute all required power flow control functionality aboard the vehicle 10 in the desired manner.

The MCP 37A, 37B may be configured as a digital computer having a microprocessor or central processing unit, read only memory (ROM), random access memory (RAM), electrically-erasable programmable read only memory (EEPROM), high speed clock, analog-to-digital (A/D) and digital-to-analog (D/A) circuitry, and input/output circuitry and devices (I/O), as well as appropriate signal conditioning and buffer circuitry. Any algorithms resident in the MCP 37A, 37B or accessible thereby, including the algorithm 100 as described below with reference to FIG. 3, can be stored in ROM and automatically executed by the controller to provide the respective functionality. The MCP 37A or 37B, or alternately the HCP 38, executes the algorithm 100 to minimize driveline stability.

Figure 2A:
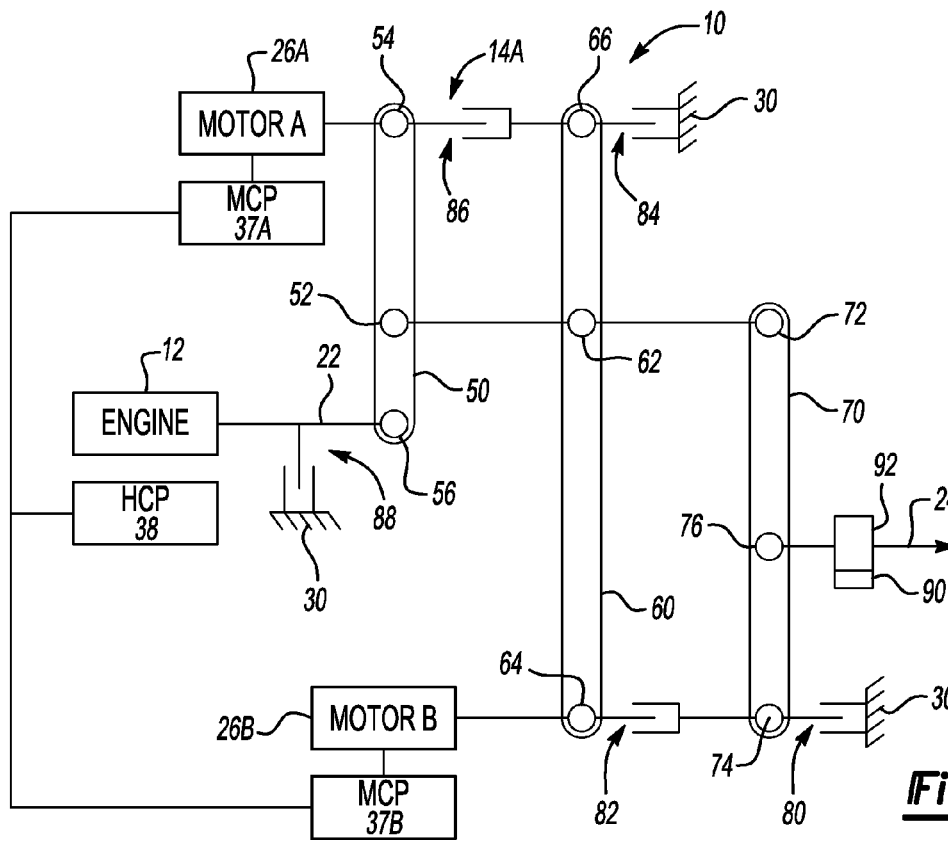
FIG. 2A is lever diagram for a transmission of the vehicle shown in FIG. 1 according to one embodiment.

Referring to FIG. 2A, one embodiment of an exemplary hybrid powertrain for vehicle 10 of FIG. 1 includes a transmission 14A. The transmission 14A includes a plurality of components generally surrounded by a stationary member 30, such as a transmission casing, shown only in fragmentary view in FIG. 2A but well understood by those skilled in the art. The transmission 14A includes an input member 22 and an output member 24, both of which are rotatable shafts or hubs. The transmission 14A further includes MGUs 26A and 26B. Both motor/generators 26A, 26B are connected via the PIM 27 to ESS 25, as explained above with reference to FIG. 1. HCP 38 controls the PIM 27 of FIG. 1 so that stored electric energy may be supplied to either MGU 26A or 26B so that the particular MGU functions as a motor, or so that torque of the motor/generator is converted to stored electric power in a generator mode.

The transmission 14A further includes three planetary gear sets 50, 60, and 70, shown in lever form, each having a first gear member, a second gear member, and a third gear member collectively establishing three nodes. Planetary gear set 50 has a first gear member 52, a second gear member 54, and a third gear member 56. The gear members 52, 54, and 56 include, in any order, a sun gear member, a ring gear member, and a carrier member that supports pinions intermeshing with the sun gear member and the ring gear member.

Planetary gear set 60 has a first gear member 62, a second gear member 64, and a third gear member 66. The gear members 62, 64, and 66 include, in any order, a sun gear member, a ring gear member, and a carrier member that supports pinions intermeshing with the sun gear member and the ring gear member. Planetary gear set 70 has a first gear member 72, a second gear member 74, and a third gear member 76. The gear members 72, 74, and 76 include, in any order, a sun gear member, a ring gear member, and a carrier member that supports pinions intermeshing with the sun gear member and the ring gear member.

The input member 22 is continuously connected for rotation with the third gear member 56. The output member 24 is continuously connected for rotation with the third gear member 76. The first motor/generator 26A is continuously connected for rotation with the second gear member 54. The second motor/generator 26B is continuously connected for rotation with the second gear member 64.

The transmission 14A includes five clutches 80, 82, 84, 86, and 88. Clutch 80 is a stationary-type clutch or brake that is selectively engageable to ground the second gear member 74 to the stationary member 30. Clutch 82 is a rotating-type clutch that is selectively engagable to connect the second gear member 64 and the second motor/generator 26B for common rotation with the second gear member 74. Clutch 84 is a stationary-type clutch or brake that is selectively engageable to ground the third gear member 66 to the stationary member 30. Clutch 86 is a rotating-type clutch that is selectively engagable to connect the second gear member 54 and the first motor/generator 26A for common rotation with the third gear member 66. Clutch 88 is a stationary-type clutch or brake that is selectively engagable to ground the input member 22 to the stationary member 30.

A hydraulic pump 90 may be geared to the output member 24 via a gear or gear train 92 that increases the speed of the pump relative to the output member 24. The pump 90 is in fluid communication with the clutches 80, 82, 84, 86 and 88, and provides additional fluid pressure to maintain one or more of the clutches in the engaged state as selected in different operating modes as speed of the output member 24 increases.

Figure 2B:
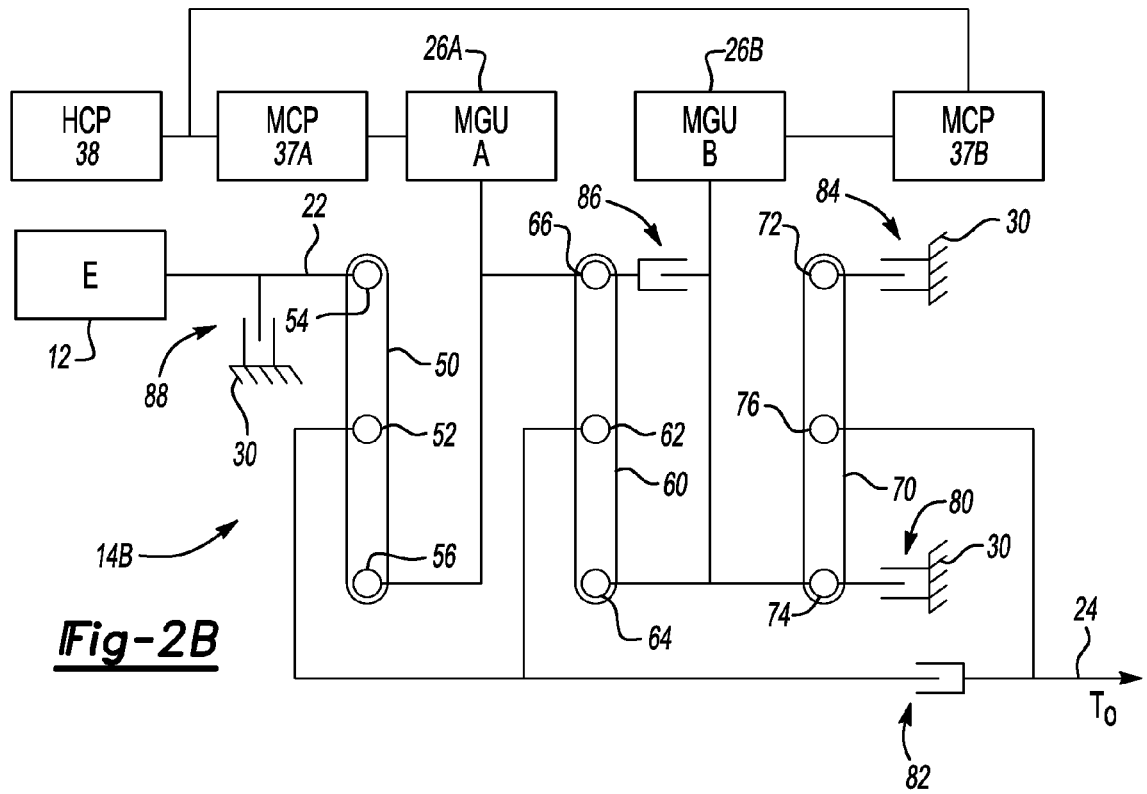
FIG. 2B is a lever diagram for a transmission of the vehicle shown in FIG. 1 according to another embodiment.
Figure 2C:
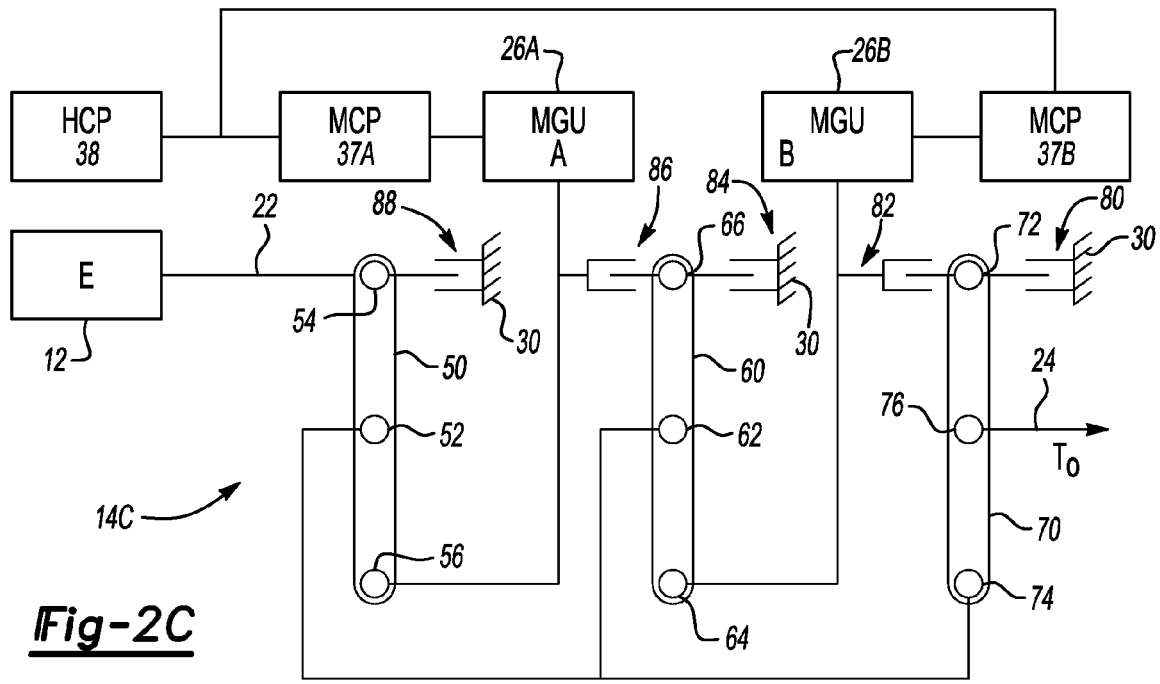
FIG. 2C is a lever diagram for a transmission of the vehicle shown in FIG. 1 according to yet another embodiment.

Referring to FIGS. 2B and 2C, additional embodiments of the transmission 14 of FIG. 1 are shown as the transmission 14B and 14C, respectively. Each embodiment is usable with the control method described below with reference to FIG. 3. For simplicity, the transmissions 14B and 14C are not described in detail, with the major components of any powertrain using the transmissions 14B and 14C, i.e., engine 12, MGUs 26A, 26B, stationary member 30, input member 22, output member 24, planetary gear sets 50, 60, and 70, and clutches 80, 82, 84, 86, and 88, being described above with respect to FIG. 2A. As FIGS. 2A-2C demonstrate, the positioning of the MGUs 26A, 26B, planetary gear sets 50, 60, and 70, and clutches 80, 82, 84, 86, and 88 may vary depending on the desired rear-wheel drive/front-wheel drive functionality and overall transmission design, without departing from the intended scope of the invention.

Figure 2D:
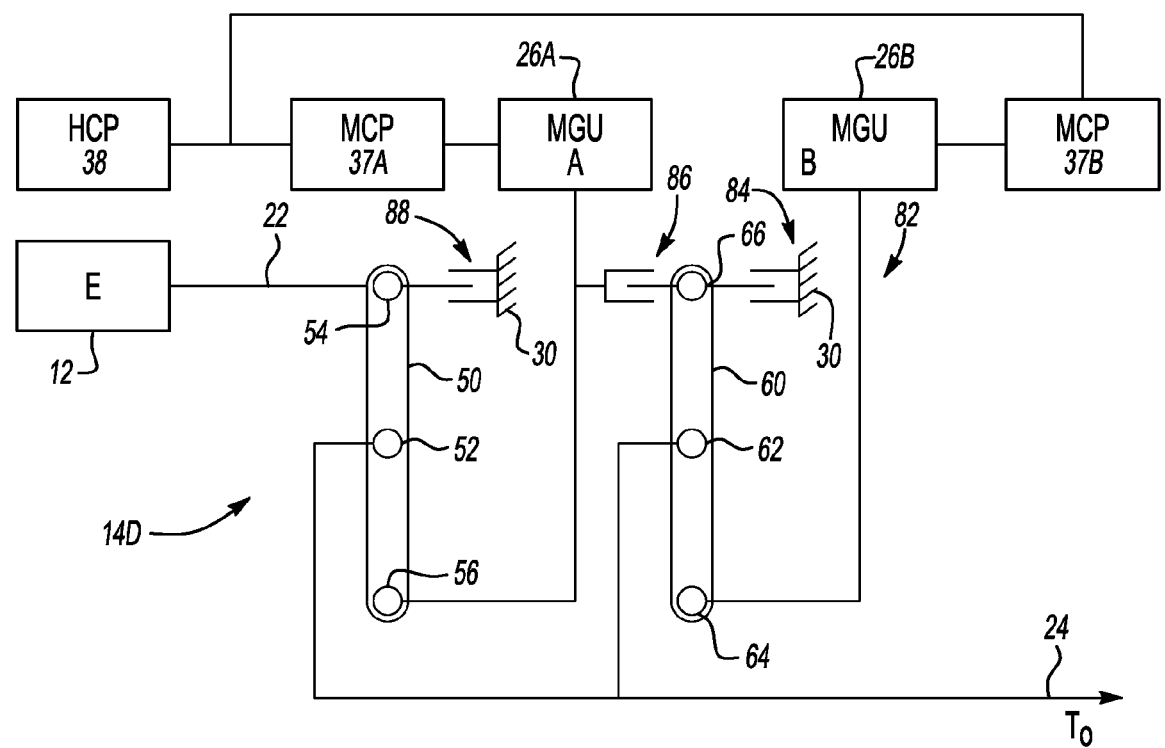
FIG. 2D is a lever diagram for a transmission of the vehicle shown in FIG. 1 according to yet another embodiment.

Referring to FIG. 2D, an additional embodiment of the transmission 14 of FIG. 1 is shown as the transmission 14D. This embodiment is also usable with the control method described below with reference to FIG. 3. For simplicity, the transmission 14D is not described in detail, with the major components of the powertrain using transmission 14D, i.e., engine 12, MGUs 26A, 26B, stationary member 30, input member 22, and output member 24 being described above with respect to FIG. 2A. In transmission 14D, planetary gear sets 50 and 60 work via clutches 84, 86, and 88. Gear members 52 and 62 are connected to the output member 24, rather than to a third planetary gear set 70 as shown in FIGS. 2A-C.

Figure 3:
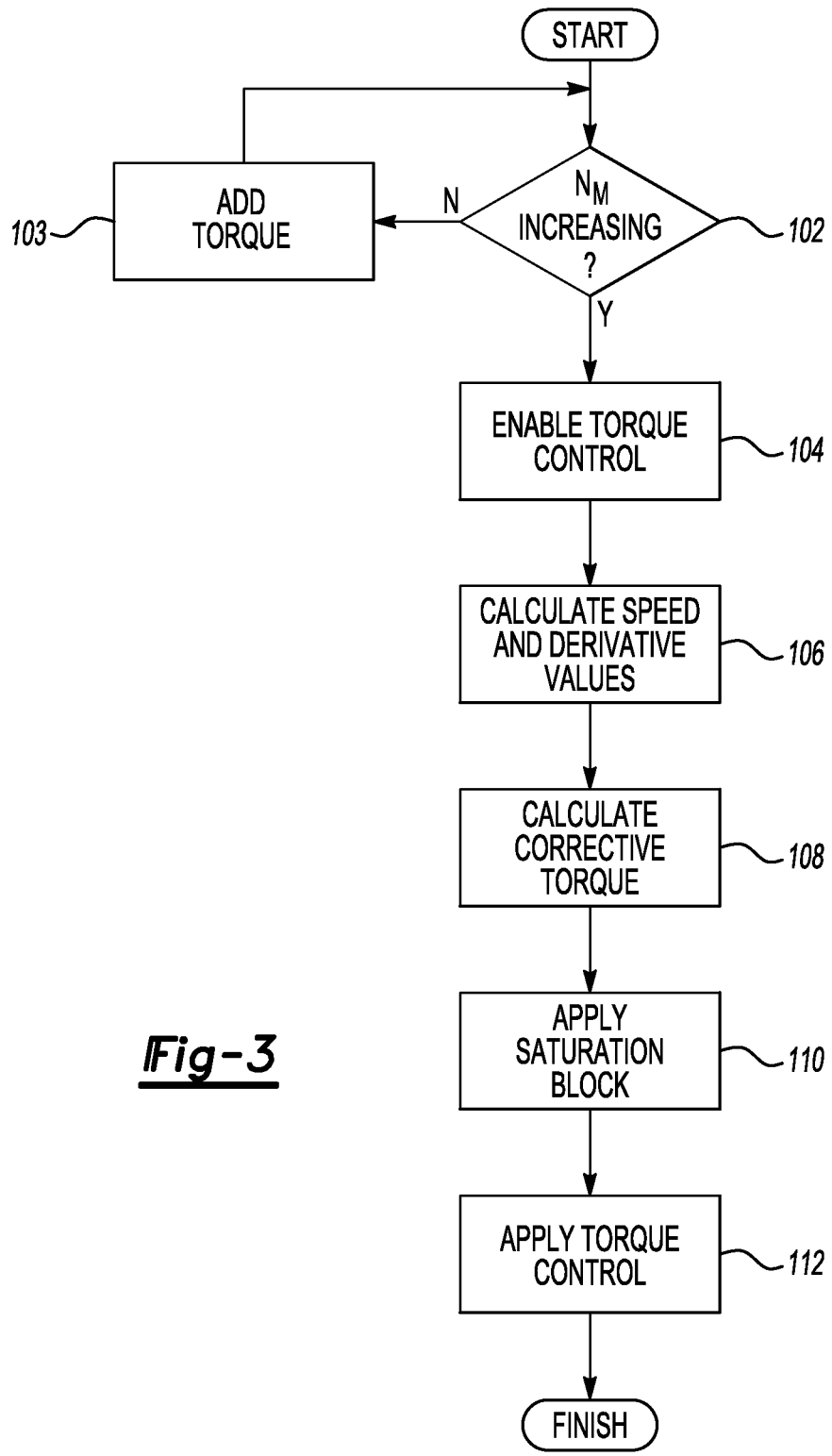
FIG. 3 is a flow chart describing the algorithm usable with the vehicle shown in FIG. 1.

Referring to FIG. 3, algorithm 100 is provided for execution by the MCP 37A, the MCP 37B, or the HCP 38 aboard the vehicle 10 shown in FIG. 1 in order to command a corrective torque command, for example from MGU 26B during a predetermined event, e.g., a restart of the engine 12 using the MGU 26A. When executed by MCP 37B, the corrective torque may be calculated in all the fast MCP processing loop time, e.g., approximately 2 ms instead of a typical SPI or CAN rate of approximately 6.25 ms or more. When executed by the HCP 38, lower-frequency driveline disturbances may be reduced, i.e., approximately 30 Hz or less.

Regardless of whether HCP 38 or MCP 37A, 37B is used, algorithm 100 begins with step 102, where a change in motor speed ($N_M$) is calculated, i.e., $\Delta N_M = N_M$ present $-N_M$ previous. If motor speed is monotonically increasing, i.e., $\Delta N_M$ is positive, the value of $\Delta N_M$ is temporarily stored in memory, and the algorithm 100 proceeds to step 104. As will be understood by those of ordinary skill in the art, in calculus a function $f$ that is defined on a subset of the real numbers with real values is called monotonic, and is monotonically increasing if, for all x and y such that $x \leq y$ one has $f(x) \leq f(y)$, $f$ preserves the order. If $\Delta N_M$ is negative or monotonically decreasing, the algorithm 100 proceeds to step 103.

At step 103, motor torque, for example of MGU 26B, may be added such that the resultant speed correction decreases the negative $\Delta N_M$ value from step 102, with a speed target of 0. The torque command uses a first calibrated coefficient (K1), and may be calculated using the formula: (K1) $\Delta N_M$. The result is referred to as Delta Speed Torque. Algorithm 100 then repeats step 102.

At step 104, motor torque control is enabled, either in via MCP 37A, 37B, or HCP 38, and the algorithm proceeds to step 106.

At step 106, various speed values are measured and calculated. The first of these is the speed derivative, i.e., the derivative of the change in motor speed, or d/dt$\Delta N$. If d/dt$\Delta N$ is positive, the torque command uses a second calibrated coefficient (K2), and may be calculated via the formula: (K2)d/dt$\Delta N$. If d/dt$\Delta N$ is negative, the torque command uses a third calibrated coefficient (K3), and may be calculated (K3)d/dt$\Delta N$. The result is the speed derivative torque. At this step, filters may be optionally applied to raw speed as well as the speed derivative to minimize noise.

Step 106 also includes calculating a motor jerk value, i.e., delta derivative ($\Delta d/dt$), as: d/dt(N, present)$-$d/dt (N, previous). If delta derivative ($\Delta d/dt$) is positive, then torque command uses a fourth calibrated coefficient (K4), and may be calculated via the formula: (K4) $\Delta d/dt$. If the delta derivative is negative, then torque command uses a fifth calibrated coefficient (K5), and may be calculated via the formula: (K5) $\Delta d/dt$. The result of step 106 is the delta derivative torque value.

At step 108, as a function of the set of motor speed values set forth above, the algorithm 100 calculates a corrective final torque value ($T_{COR}$) that is added to any torque command ordinarily commanded by the particular MCU 37A, 37B. For example, the following equation may be used: $T_{COR}$=Delta Speed Torque+Speed Derivative Torque+Delta Derivative Torque. The algorithm 100 then proceeds to step 110.

At step 110, the corrective torque ($T_{COR}$) from step 108 may be subjected to a calibrated saturation block that imposes a maximum and a minimum torque level. Once limited in this manner, the algorithm proceeds to step 112.

At step 112, the torque command is applied to one of the MGUs 26A, 26B. For example, MGU 26B may be commanded via the torque command during a predetermined event in which the MGU 26A is used to start the engine 12. Beginning and ending of torque control may be determined by proportionality gains with respect to acceleration values and jerk values. Alternately, control may be implemented based on auto start/stop state machine states, and/or timers based on state transitions. Similarly, control system moding may allow for ramping out of the control output torques, a hold period at full torque, and a calibrated ramp out rate.

Torque security concerns may require a torque biasing function. When the proposed driveline oscillation smoothing control system is working, over any given time period the sum of the corrective torque should be approximately zero, i.e., zero bias. If the proposed system goes out of control, the sum of the corrective torque value will start to bias away from zero, in either the positive or negative direction. If this happens, the bias torque value may be multiplied by a calibrated gain such that the corrective torque value, e.g., the sum of the delta speed torque value, speed derivative torque value, and delta derivative torque value explained above, will be driven toward a zero torque bias value. This makes it impossible for the control process to execute a corrective torque that would cause unwanted positive or negative axle torques aboard the vehicle 10 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A method for minimizing driveline disturbances in a vehicle having a motor generator unit (MGU) and a controller, the method comprising:
   determining, via the controller, a set of motor values of the MGU, including a change in motor speed, a derivative of the change in motor speed, and a motor jerk value;
   calculating, via the controller, a corrective final torque value for the MGU as a function of the set of motor values, including:
   multiplying the change in motor speed by a first calibrated coefficient to thereby determine a delta speed torque value;
   multiplying the derivative by a respective one of a second and a third calibrated coefficient when the derivative is positive or negative to thereby determine a speed derivative torque value;
   multiplying the motor jerk value by a respective one of a fourth and a fifth calibrated coefficient when the motor jerk value is positive or negative to thereby determine a delta derivative torque value; and
   calculating the corrective torque value as a function of the delta speed torque value, the speed derivative torque value, and the delta derivative torque value; and
   commanding the corrective final torque value from the MGU during a predetermined event of the vehicle to thereby minimize the driveline disturbances during the predetermined event;
   wherein determining the set of motor values, calculating the corrective final torque value, and commanding the corrective final torque value are each conducted by the controller and fully within a calibrated minimum processing loop time of the controller.

2. The method of claim 1, further comprising: using the controller as a motor control processor that is in communication with a hybrid control processor.

3. The method of claim 1, wherein the function is an addition of the delta speed torque value, the speed derivative torque value, and the delta derivative torque value.

4. The method of claim 1, further comprising: enabling torque control only when motor speed of the MGU is monotonically increasing.

5. The method of claim 1, further comprising: applying a calibrated saturation block to the corrective torque value to thereby limit the corrective torque value.

6. The method of claim 1, further comprising: ramping out the corrective torque value using a calibrated ramp-out rate.

7. The method of claim 1, further comprising: determining a bias torque value as the corrective torque value biases away from zero, and multiplying the bias torque value by a calibrated gain such that the corrective torque value is driven toward a zero torque bias value.

8. A method for minimizing driveline disturbances in a vehicle having a controller, a first motor generator unit (MGU), and a second MGU, the second MGU being connected directly to a driveline of the vehicle, the method comprising:
   determining a set of motor values of the second MGU using the controller, including a change in motor speed, a derivative of the change in motor speed, and a motor jerk value;
   calculating a corrective final torque value as a function of the set of motor values using the controller, including:
   multiplying the change in motor speed by a first calibrated coefficient to thereby determine a delta speed torque value;
   multiplying the derivative by a respective one of a second and a third calibrated coefficient when the derivative is positive or negative to thereby determine a speed derivative torque value;
   multiplying the motor jerk value by a respective one of a fourth and a fifth calibrated coefficient when the motor jerk value is positive or negative to thereby determine a delta derivative torque value; and
   calculating the corrective torque value as a function of the delta speed torque value, the speed derivative torque value, and the delta derivative torque value; and
   commanding the corrective torque value from the second MGU via the controller during a starting event of the first MGU;
   wherein determining a set of motor values, calculating a corrective final torque, and commanding the corrective torque all occur within a calibrated minimum processing loop time of the controller.

9. The method of claim 8, wherein the controller is one of: a motor control processor and a hybrid control processor.

10. The method of claim 8, wherein using the controller to command the corrective torque value from the driveline MGU during a starting event of the first MGU includes providing fulcrum stability control to the first MGU via the second MGU during the starting event of the first MGU.

11. The method of claim 8, wherein the function is an addition of the delta speed torque value, the speed derivative torque, and the delta derivative torque value.

12. The method of claim 8, further comprising: enabling torque control only when motor speed value is monotonically increasing.

13. The method of claim 8, further comprising: applying a calibrated saturation block to the corrective torque value to thereby limit the corrective torque value.

14. The method of claim 8, further comprising: determining a bias torque value as the corrective torque value biases away from zero, and multiplying the bias torque value by a calibrated gain such that the corrective torque value is driven toward a zero torque bias value.

15. A vehicle comprising:
   a first motor generator unit (MGU);
   a second MGU; and
   a controller that is electrically connected to the second MGU, and configured to execute an algorithm for minimizing driveline disturbances in the vehicle during a starting event of the first MGU;
   wherein execution of the algorithm by the controller causes the controller to:
      determine a set of motor values of the second MGU, including a change in motor speed, a derivative of the change in motor speed, and a motor jerk value;
      calculate a corrective final torque value for the second MGU as a function of the set of motor values, including:
         multiplying the change in motor speed by a first calibrated coefficient to thereby determine a delta speed torque value;
         multiplying the derivative by a respective one of a second and a third calibrated coefficient when the derivative is positive or negative to thereby determine a speed derivative torque value;
         multiplying the motor jerk value by a respective one of a fourth and a fifth calibrated coefficient when the motor jerk value is positive or negative to thereby determine a delta derivative torque value; and
      calculating the corrective torque value as a function of the delta speed torque value, the speed derivative torque value, and the delta derivative torque value; and
      command the corrective final torque value from the second MGU during a starting event of the first MGU to thereby minimize the driveline disturbances during the starting event;
   wherein the controller determines the set of motor values, calculates the corrective final torque value, and commands the corrective final torque value all within a calibrated minimum processing loop time of the controller.

16. The vehicle of claim 15, further comprising:
   a transmission having an input member, an output member, a first planetary gear set connected to the input member, a second planetary gear set connected to the output member, and one of a connecting member and a third planetary gear set connecting the first and the second planetary gear sets; and
   an engine selectively connectable to the first planetary gear set;
   wherein the first MGU is continuously connected to the first planetary gear set, and the second MGU is continuously connected to the second planetary gear set and the output member.

17. The vehicle of claim 15, wherein the controller is configured to: determine a bias torque value as the corrective torque biases away from zero, and multiply the bias torque value by a calibrated gain such that the corrective torque is driven toward a zero torque bias value.

* * * * *